Jan. 16, 1951 P. COTTON 2,538,085
STORYBOOK BLOCK SET
Filed Jan. 9, 1948 2 Sheets-Sheet 1
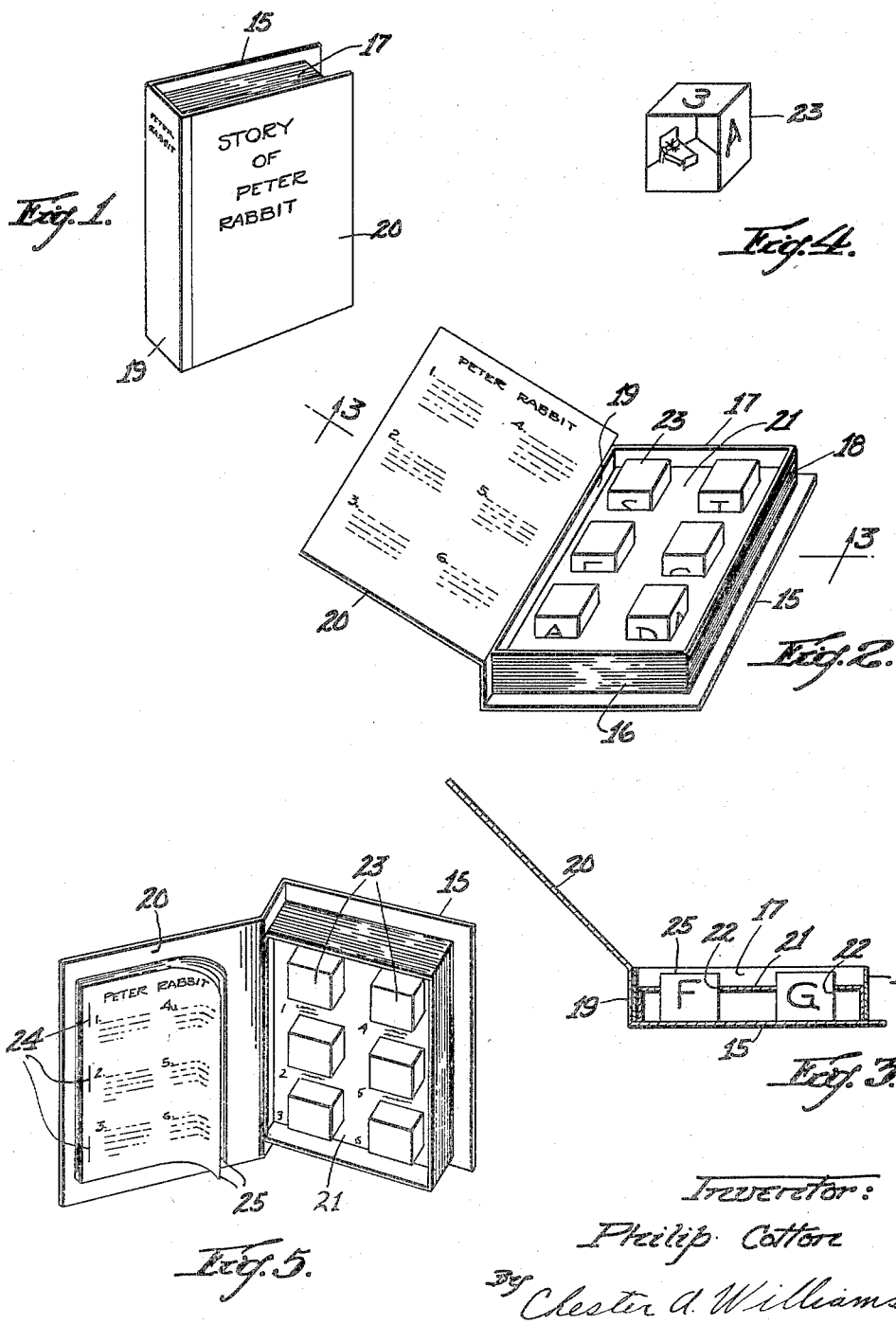
Inventor:
Philip Cotton
By Chester A. Williams
Attorney

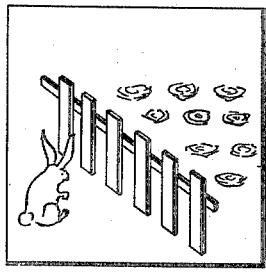
Rabbit notices garden on other side of fence.
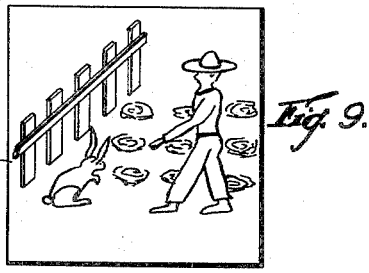
Rabbit spies farmer.
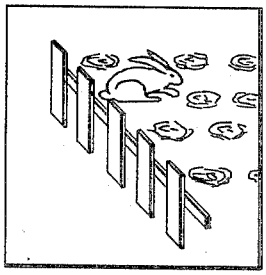
Rabbit jumps fence in order to get into garden.
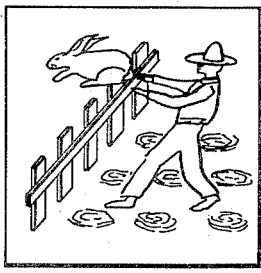
Rabbit jumps fence to escape farmer.
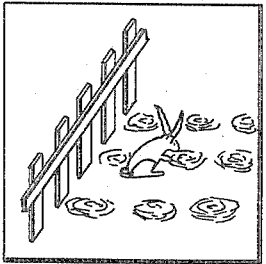
Rabbit eats vegetables
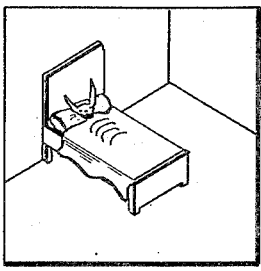
Rabbit home in bed.
Inventor:
Philip Cotton
By Chester A. Williams
Attorney Patented Jan. 16, 1951

2,538,085

UNITED STATES PATENT OFFICE 2,538,085

STORYBOOK BLOCK SET

Philip Cotton, Worcester, Mass., assignor to Cotton & Frank Company, Worcester, Mass., a corporation of Massachusetts Application January 9, 1948, Serial No. 1,462

2 Claims. (Cl. 35—8)

The present invention relates to the construction of books, games, or similar articles for the amusement and instruction of children. More particularly, the present invention relates to a combination story book and block set.

A primary object of the present invention is to provide a story book having incorporated therein a set of mobile blocks which are so designed as to be inter-related with a story or legend printed in the book to the end that a child may gain amusement and education by arranging the blocks in their proper story sequence as controlled by the printed matter.

Another object of the present invention is to provide a combined story book and block set which is most attractive in appearance and which at the same time, is designed to be readily and inexpensively manufactured.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Fig. 1 represents a perspective view of the present invention showing that the latter in its complete form has the appearance of a normal story book.

Fig. 2 represents a perspective view of the invention with the cover portion thereof in its opened position thereby to disclose the contents of the unit.

Fig. 3 represents a sectional view taken substantially along the lines 3—3 of Fig. 2.

Fig. 4 represents a perspective view, on an enlarged scale, of one of the blocks which is adapted to be contained within the unit disclosed in Fig. 2.

Fig. 5 represents a perspective view of a second form of the present invention.

Figs. 6 to 11, inclusive, represent, on an enlarged scale, one face portion of each of the blocks disclosed in Fig. 2.

Referring particularly to Figs. 1, 2 and 3, the present invention essentially comprises a box which is made up so as to have the appearance of a story book. More specifically, this box comprises a bottom 15 upon which are secured upstanding end portions 16 and 17, and a pair of upstanding side portions 18 and 19. These end and side portions are suitably secured together so as to form an open top chamber. Hingedly secured along the top edge portion of the member 19 is a cover 20. As thus described, the present invention may be constructed in the usual manner of boxes and thus, may utilize cardboard, wood, or other suitable materials in the construction thereof. It is to be particularly noted that the bottom, edge and cover portions 15, 19 and 20 have their marginal edge portions extending beyond the confines of the members 16, 17 and 18 so as to simulate the shape of a book. Of course, the outside portions of this box may be appropriately painted or covered in a manner such as will heighten the "book" effect thereof.

Referring particularly to Figs. 2 and 3, there is adhesively secured within the confines of the box, a baffle member 21 which is provided with a plurality of square apertures 22, 22 each of which is adapted to receive slidingly therein a cubical shaped block 23. These blocks are adapted to be so dimensioned that they will rest upon the bottom 15 and at the same time will permit the cover member 20 to be closed properly. When the cover member is so closed, it will, of course, prevent the blocks from shifting out of the apertures 22, 22.

Referring particularly to Fig. 2, there is printed on the inside portion of the cover 20 an appropriate child's story such as, for example, Peter Rabbit. In one form of the present invention, it is contemplated that such a story be broken down into a series of single episodes, each one of which may be printed as a single paragraph upon the inside portion of the cover. For example, Fig. 2 discloses that the cover 20 has printed thereon two columns of paragraphs, each paragraph of which is appropriately and successively numbered from one to six. Thus, the story printed on the inside cover portion is broken down into six separate episodes which, when read in the usual sequence, make for a complete story.

Still referring to Fig. 2, it is to be understood that the apertures 22, 22 of the baffle member 21 are arranged in two vertical columns so that the various blocks 23, 23 may be arranged in the same order as are the story paragraphs which are printed upon the cover 20. It is also to be noted that one block is provided for each of the printed paragraphs. The preferred form of the present invention contemplates that the exposed face of each of the six blocks is adapted to have portrayed thereon a picture of the central character of the selected story and, furthermore, each block will illustrate this central character as partaking of the particular action described in that paragraph on the cover 20 which corresponds in space relation to such block. Thus, one may read the various paragraphs printed on the cover 20, and by referring to the corresponding blocks within the box, it will be found that the actions set forth in the paragraphs are all illustrated on the blocks and in the proper sequence.

From the foregoing, it is to be understood that the present invention provides an amusing as well as an educational device which is primarily adapted for use by children. Such a device will help the child to learn to read for the reason that it will stimulate an interest in reading. Obviously, the present invention may be employed as a puzzle or game for the various blocks may be removed from the book and thereafter the child may be given the task of properly positioning the blocks within their apertures in a manner such that they will present a sequence of actions which will correspond to those set forth in the story as printed upon the cover 20.

Referring particularly to Figs. 6 to 11, inclusive, the various blocks 23, 23 are illustrated as arranged in the same sequence as they are adapted to be disposed in Fig. 2. For example, paragraph 1 as printed on the cover 20 may set forth that the central story character, Peter Rabbit, during a walk one day, spies Mr. MacGregor's vegetable garden patch on the other side of the fence. Fig. 6 illustrates this particular episode.

Paragraph 2 may state that Peter Rabbit, feeling particularly hungry, can no longer resist such a temptation and consequently, leaps over the fence and into Mr. MacGregor's vegetable garden patch. This episode is illustrated in Fig. 7.

Paragraph 3 may set forth that Peter Rabbit, upon arriving in Mr. MacGregor's garden patch, finds the various vegetables very delicious and thus, fills his stomach with Mr. MacGregor's vegetables. Fig. 8 illustrates this episode.

Paragraph 4 may state that Peter Rabbit, while eating Mr. MacGregor's vegetables, happens to glance up, and whom should he see but Mr. MacGregor advancing toward him with an angry glint in his eye. Fig. 9 portrays this particular episode.

Paragraph 5 may state that Mr. MacGregor dashes toward Peter Rabbit in an endeavor to catch him, but Peter just manages to jump over the fence and break away from Mr. MacGregor in an effort to get home safely. Fig. 10 illustrates this particular episode.

Paragraph 6 may bring the story to its conclusion by stating that Peter Rabbit finally arrives home safely but exhausted and thus, climbs immediately into his bed, with the promise that he will never go into Mr. MacGregor's garden patch again. Fig. 11 illustrates this final episode.

From the foregoing, it should be obvious that the exposed face of each of the various blocks has portrayed thereon the action described in the corresponding paragraph as printed on the cover 20. Thus, as these paragraphs are read in proper sequence, a glance at the corresponding block will illustrate the particular action described in the paragraphs.

Referring particularly to Fig. 4, it is to be understood that although one particular face of each of the blocks 23, 23 is adapted to have portrayed thereon a particular episode from the story printed on the cover, the remaining five faces of each block may have printed or otherwise portrayed thereon various other items of intelligence such as Roman numerals or letters of the alphabet.

Referring particularly to Fig. 5, there is disclosed a second form of the present invention which is substantially the same as that form disclosed in Fig. 2, with the exception that instead of printing a single story on the inside cover portion of the box, there is secured to the cover a plurality of pages. More specifically, the inside cover portion 20 has secured, as by staples 24, a plurality of pages which are generally designated by the numeral 25. Each of these pages may have printed thereon an appropriate story in the same manner as is described hereinabove. Thus, this modified form of story book is provided with a plurality of stories, each of which may be properly illustrated on different faces of the various blocks 23, 23. In other words, as each page is turned, the child may then rearrange the various blocks within the box so that the blocks will portray thereon that character which corresponds with the selected printed story. Since each block has six faces, it is possible to print at least six stories within the book. These pages are so dimensioned that they will be received within the confines of the box whenever the cover 20' is shifted to its closed position.

It is also within the purview of the present invention to print one or more stories or legends upon the exposed face of the baffle member 21 rather than upon the inside portion of the cover 20. For example, various episodes of a single story or various individual rhymes may be printed upon the baffle member 21 adjacent a respective one of the blocks 23, 23. Referring to Fig. 5, this latter form of the invention is illustrated as having individual episodes of a single story or single rhymes printed upon the baffle member 21 adjacent a respective one of the blocks 23, 23. These episodes or rhymes are designated by the Figures 1 to 6, inclusive. Of course, these rhymes or episodes may be portrayed or printed upon the baffle member 21 in any other convenient configuration. However, it is to be understood that each of the rhymes or episodes printed upon the baffle will be illustrated by means of an appropriate picture portrayed upon the exposed face of that block adjacent a respective one of the episodes or rhymes.

A great variety of modifications of the above described story book block set will at once suggest itself to one and, of course, the scope of the present invention is not to be limited to the particular story idea herein described and illustrated. It is also obvious that the particular shape and dimension of the box or "book" will depend upon the size, number, and arrangement of the blocks in the set. As a matter of fact, it is not necessary to print a story in the present book for other intelligence-transmitting indicia could be printed therein for the purpose of corresponding with the indicia or legend portrayed upon the exposed faces of the various blocks.

I claim:

1. A device of the class described comprising, a box-like structure having an open-faced chambered portion and a cover hingedly secured at one side of said chambered portion, said cover having a series of stories or episodes printed upon the inside surface thereof in a particular sequence and arrangement, a baffle member having a plurality of spaced-apart apertures therein and secured within said chambered portion so as to be spaced from the bottom thereof, the apertures being arranged within said baffle member in a manner and sequence similar to that of the stories or episodes printed on said cover, and a plurality of cubical blocks each being removably disposed within a respective one of the baffle apertures and having pictorial representations on each face thereof, each of said blocks having illustrated in picture form on one face thereof one or more of the ideas set forth in the stories or episodes so that when the blocks are properly placed within the baffle apertures with such picture faces exposed they will as a group illustrate in proper sequence the stories or episodes printed on said cover.

2. A device of the class described comprising, an open box-like receptacle having a false bottom provided with a number of spaced apertures, a cover hinged to one side of said receptacle, said cover having a series of stories or episodes printed upon its inside surface in an arrangement similar to that of said apertures, and a plurality of rectangular blocks receivable within said apertures, with one face of each block uppermost and the remaining faces partially concealed below said false bottom, and with said blocks having illustrated in picture form, on one face thereof, a respective one of the stories or episodes printed on the cover, so the illustrations exposed uppermost thereon, when placed in said apertures, may partake of an arrangement and sequence similar to that of the said stories or episodes on the cover.

PHILIP COTTON.

REFERENCES CITED

The following references are of record in the file of this patent:

UNITED STATES PATENTS

| Number | Name | Date |
| --- | --- | --- |
| 556,467 | Koerner | Mar. 17, 1896 |
| 650,320 | Hepfinger | May 22, 1900 |
| 1,414,849 | Williams | May 2, 1922 |
| 1,729,518 | Newman | Sept. 24, 1929 |
| 2,310,800 | Manhard | Feb. 9, 1943 |